E. E. WINKLEY.
MACHINE FOR HANDLING WASHERS AND ANALOGOUS ARTICLES.
APPLICATION FILED DEC. 16, 1916.
1,358,910.
Patented Nov. 16, 1920.
2 SHEETS—SHEET 1.
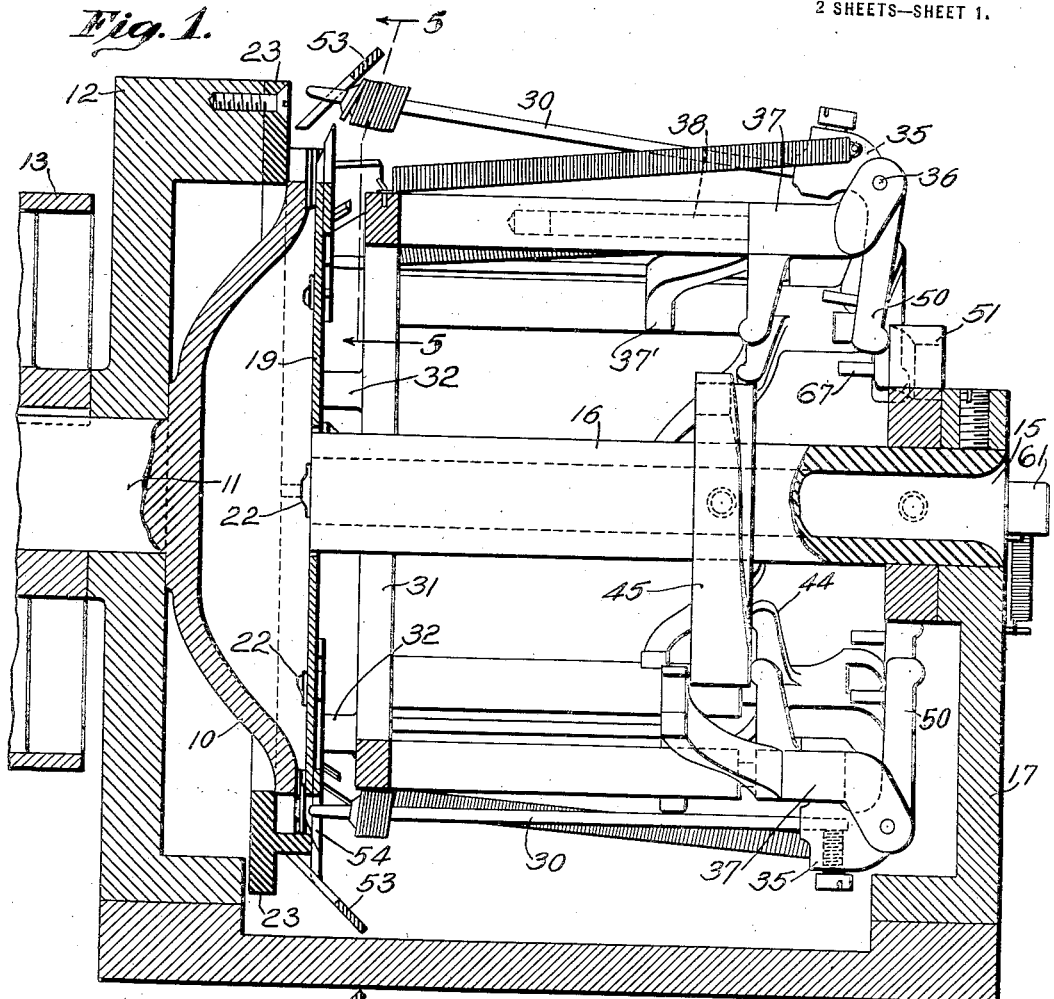
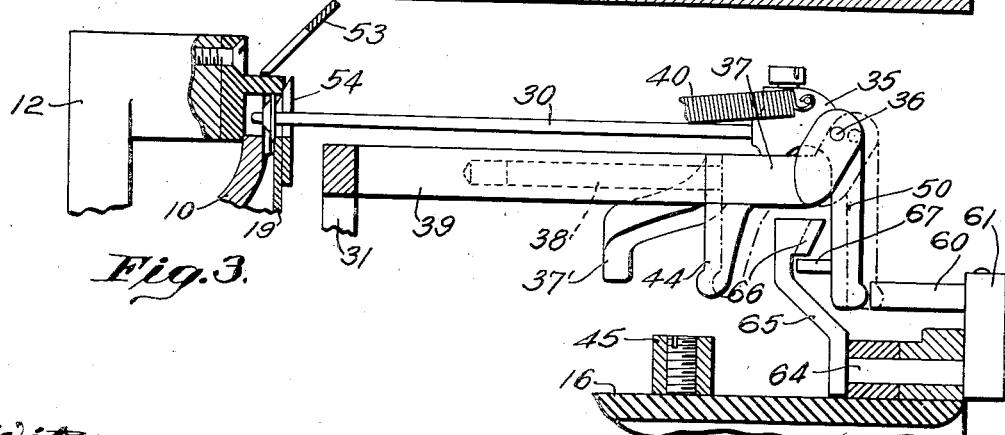

E. E. WINKLEY.
MACHINE FOR HANDLING WASHERS AND ANALOGOUS ARTICLES.
APPLICATION FILED DEC. 16, 1916.
1,358,910.
Patented Nov. 16, 1920.
2 SHEETS—SHEET 2.
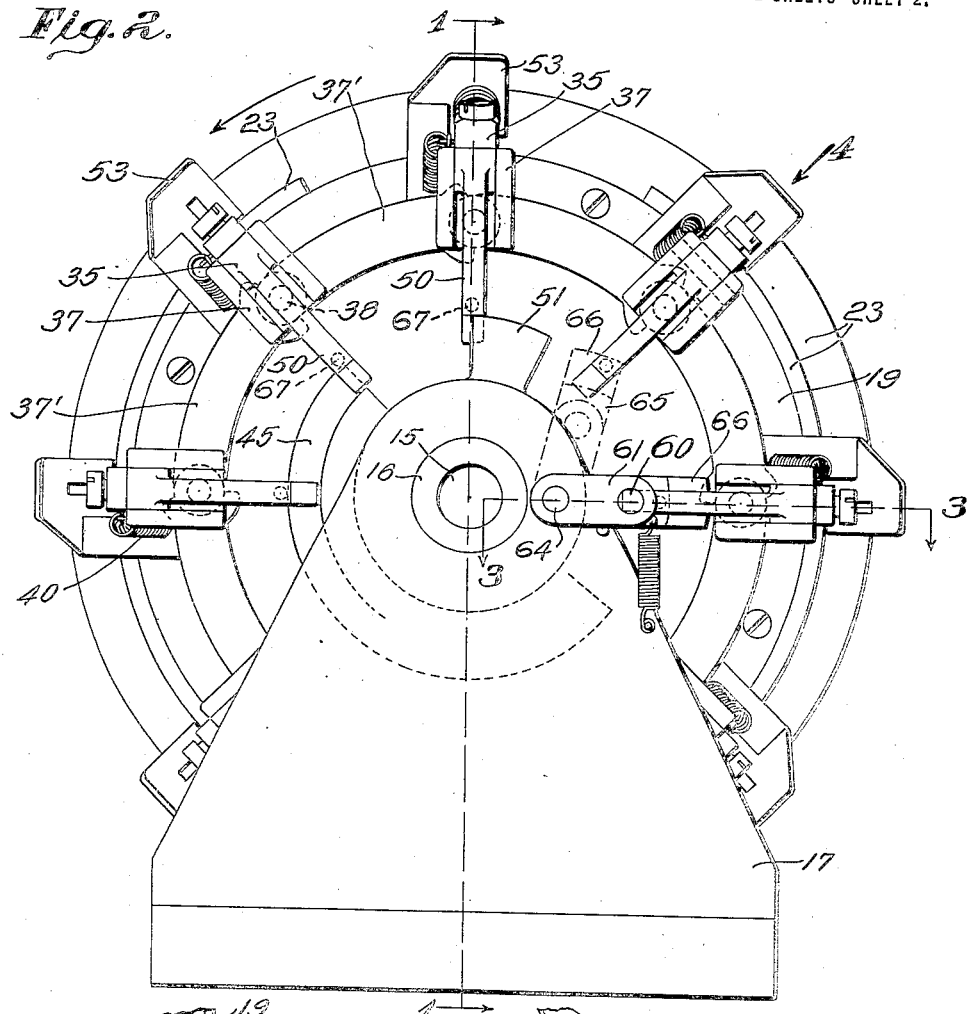
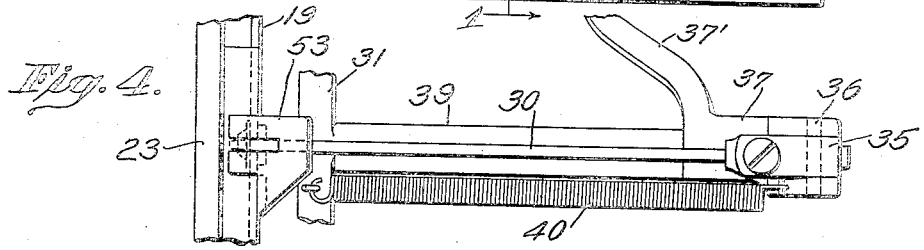
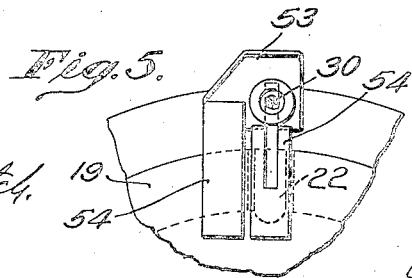

UNITED STATES PATENT OFFICE.

ERASTUS E. WINKLEY, OF LYNN, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

MACHINE FOR HANDLING WASHERS AND ANALOGOUS ARTICLES.

1,358,910. Specification of Letters Patent. Patented Nov. 16, 1920.

Application filed December 16, 1916. Serial No. 137,367.

*To all whom it may concern:*

Be it known that I, ERASTUS E. WINKLEY, a citizen of the United States, residing at Lynn, in the county of Essex and State of Massachusetts, have invented certain new and useful Improvements in Machines for Handling Washers and Analogous Articles; and I do hereby declare the following to be a full, clear, and exact description of the invention, such as will enable others skilled in the art to which it appertains to make and use the same.

The present invention relates to machines for handling washers and analogous articles, and more particularly to machines of this type when employed for assembling and stacking washers and analogous articles.

Rubber heels are customarily provided with a series of metallic washers embodied therein to act as supports for the fastening members. It is desirable that some means be provided for partially or wholly assembling and arranging the washers to facilitate locating them in the heel molds.

To this end an object of the present invention is to provide an improved machine which automatically sorts separate washers from a mass and stacks these washers so that they may be subsequently utilized.

With this object in view the several features of the invention consist in certain novel features of construction, combinations and arrangements of parts hereinafter described and claimed, the advantages of which will be obvious to those skilled in the art from the following description.

In the accompanying drawings illustrating the preferred form of the invention, Figure 1 represents a longitudinal section in elevation, partly in full lines taken upon the line 1—1 of Fig. 2; Fig. 2 is a front elevation of the machine shown in Fig. 1; Fig. 3 is a detail showing a section upon the line 3—3 of Fig. 2; Fig. 4 is a detail showing a plan view of one of the collecting fingers and the coöperating stripper plate; and Fig. 5 is a section upon the line 5—5 of Fig. 1.

The machine shown in the illustrated embodiment of the invention is provided with a rotary hopper 10 secured to a shaft 11 journaled in bearings formed in a frame 12 and rotated by a pulley 13 secured to the shaft 11. The washers or analogous articles are fed to the hopper through an axial passage 15 formed in a tube 16 secured at its outer end in a head 17 as shown clearly in Fig. 2. The front portion of the hopper 10 is closed by a plate 19 secured thereto, and as shown clearly in Fig. 1, the shape of the hopper is such that the walls converge toward the periphery to aid in the positioning of the washers. The peripheral edge of the hopper is provided with a series of openings or slots 22 shaped to conform with the shape of the washer, and of a size to permit one washer to slide therethrough. The washers, as shown clearly in the drawings, are slightly dished, and in order that a washer shall pass through the opening it is necessary that the washer be arranged as shown in Fig. 1, with the cupped portion of the washer facing the plate 19. This insures that all washers which pass out of the hopper through the openings shall be of the same size and arranged in the same manner. Surrounding the lower portion of the hopper is a stationary curved guide 23, and as the hopper rotates the washers drop into the slots 22 resting against the bottom of the guides 23 as the openings successively pass thereover. The washer when dropped into the slot assumes the position shown in Fig. 1. In this position the washer is constrained to move with the rotating hopper in a path determined by the guide member 23.

In order to engage and hold the washers which have thus dropped into the slots, a series of collecting members are provided, one collecting member being positioned opposite each opening 22. These collecting members are positioned out of the path of the washer when it drops through the opening 22 at the bottom of the hopper, and are thereafter moved into engagement with the washer to prevent the washer dropping back into the hopper on the continued rotation of the hopper. To this end a series of collecting fingers 30 are supported upon a spider 31 secured to the hopper through arms 32, and are so arranged with respect to the openings 22 that the end of each finger is positioned opposite the opening in a washer when it has dropped through the opening upon the guide 23. As shown clearly in Figs. 1 and 3 of the drawings, each finger is secured in a rocker member 35 pivoted at 36 upon a slide 37. The slide 37 is provided with a longitudinally extending stud 38 received within a corresponding bore formed in an arm 39 secured to the spider 31. Rotary movement of the slide with relation to the arm 39 is prevented by an arm 37' which embraces the arm 39 and is secured to the slide 37. Owing to this construction the finger may be either rocked about the pivot 36 or moved bodily through the movements of the slide 37 relative to the spider, for a purpose to be presently described. Each finger is normally retained in the position shown in Fig. 3 by a coiled spring 40 connecting the rocker member 35 with the spider 31. In order to permit the passage of a washer through the opening 22 when the opening reaches a position where the washer will pass therethrough by gravity, it is essential that mechanism be provided for maintaining each finger in substantially the position shown at the bottom in Fig. 1 during the passage of the finger through the lower portion of the path of movement. To this end each slide 37 is provided with a depending arm 44 which is adapted to engage with a stationary cam 45 during the rotation of the hopper. It will be noted from an inspection of Fig. 1 that the cam 45 is secured to the stationary feeding tube 16 and the lower portion of the cam face is arranged to engage successively with the arms 44 and to have the slide 37 and finger 30 carried thereby into substantially the position shown at the bottom of Fig. 1. The finger is maintained in this position during its movement through the lower portion of the path in order to afford ample time for the washer to drop through the opening and assume a position in which the center of the washer is positioned opposite the end of the finger. After the washer has dropped through the opening and before the hopper has rotated to a point at which there will be any liability of the washer dropping back through the opening, the cam 45 permits the finger 30 to be moved inwardly under the action of the spring 40 to cause the insertion of the end of the finger through the opening in the washer. In this position the washer is firmly retained by the finger and is prevented from dropping back into the hopper when the washer is carried up to the top of the latter.

After each washer has been located properly upon a corresponding finger, it is essential that the washer be removed completely from the hopper in order to clear the opening and permit a new washer to drop therethrough at the proper time. To this end mechanism is provided for elevating each finger at a predetermined time to completely remove the washer from the opening in the hopper.

In connection with this mechanism means are provided for forcing the washer along the finger and for retaining the washer thus forced along in position upon the finger. Each rocker member 35 is provided with a depending arm 50 which engages with a cam rib 51 secured to the feeding tube 16, as shown clearly in Fig. 1, and serves to rock the finger 30 upwardly, removing the washer from the slot in the hopper. It will be obvious that the engagement of the arm 50 with the cam rib 51 does not take place until after the arm 44 has become disengaged from the stationary cam 45, as shown clearly in Fig. 1. A tilting movement of the finger causes the washer to be engaged by an inclined plate 53 which forces the washer along the finger, as shown clearly in Fig. 1. This plate is slotted to permit the end of the finger 30 to move relatively thereto, and is mounted upon an arm 54 secured to the plate 19. It will be noted that a series of plates are provided, one for each finger, and that these plates rotate with the hopper and fingers. When the finger 30 is permitted to move backward into normal position, the last washer which has been forced along the finger by the plate 53 engages behind the arm 54, which serves to retain the washer upon the finger and prevent accidental removal thereof.

It will be observed that the foregoing construction serves to remove individual washers from the hoppers and stack or assemble these washers upon the several collecting fingers with all of the washers arranged in the same relation to one another. After the washers have been collected in stacks upon the fingers they may be removed either by sliding each separate stack of washers off the respective finger, or by removing the fingers from the rocker members in which they are secured.

Under certain circumstances, however, the washers may not drop completely through the openings into a position where they are properly centered with relation to the fingers, either because the washers are too large to pass completely through the openings, or because of some other reasons causing the washers to wedge in the openings. When this occurs, it is essential that mechanism be provided for modifying the action of the finger in order that the movement of the finger into engagement with the washer shall not serve to wedge the latter tightly in the opening. To this end, as shown clearly in Figs. 2 and 3, a dog 60 is secured to an arm 61 and extends laterally therethrough into a position at one side of the normal path of movement of the arms 50. It will be noted that when each of the arms 50 reaches a position opposite the dog 60 the slide 37 carrying the arm has been moved inwardly by the spring 40 to insert the end of the finger 30 within the washer. When the washer is improperly positioned within the slide so that the finger may not project through the opening, the slide 37 is not allowed to complete its movement, owing to the engagement of the face of the finger with the face of the washer. This causes the arm 50 carried thereby to assume somewhat the position as shown in dotted lines in Fig. 3 when it reaches a position opposite the dog 60. When the arm is positioned in this manner it engages with the dog 60 and rocks the arm 61 about the pivot 64. The opposite end of the finger 64 is provided with a second arm 65 having a cam face 66 formed thereon. This cam face is normally positioned out of the path of a pin 67, but the rocking movement of the arm 65 swings the cam face into the path of the pin 67, and owing to the engagement therewith moves the arm 50 and slide 37 to the right, disengaging the finger 30 from the washer and permitting the washer to drop back into the hopper.

While it is preferred to employ the specific construction and arrangement of parts shown and described, it will be understood that this construction and arrangement is not essential except so far as specified in the claims, and may be changed or modified without departing from the broader features of the invention.

The invention having been described, what is claimed is:

1. A washer handling machine, having in combination, a rotary hopper, a series of collecting members revolving about the axis of the hopper, means for causing washers to be delivered singly from the hopper to the collecting members facing in the same direction, and means for actuating the collecting members to remove the washers from the hopper.

2. A washer handling machine having, in combination, a rotary hopper provided with a series of slots in the periphery into which the washers drop by gravity, a collecting finger associated with each slot and revolving about the axis of the hopper, and mechanism for actuating the fingers to cause them to engage and successively remove the washers from the slots in the hopper.

3. A washer handling machine, having in combination, a rotary hopper having a series of openings, a series of collecting fingers positioned opposite the openings and revolving about the axis of the hopper, and means for first actuating the fingers to engage with the washers and for next actuating the fingers to lift the washers from the hopper.

4. A washer handling machine, having in combination, a vertical hopper having a series of openings formed in the periphery, means for rotating the hopper to cause the washers to pass through the openings, a collecting member positioned adjacent each opening and revolving about the axis of the hopper, and mechanism for actuating the members to engage and remove the washers successively from the openings.

5. A washer handling machine, having in combination, a rotary hopper having a series of openings formed in the periphery, a guard surrounding the lower portion of the hopper, means for rotating the hopper to cause washers to pass through the openings and drop upon the guard, a collecting member positioned adjacent each opening and revolving about the axis of the hopper, and mechanism for actuating the members to engage with the washers which have dropped through the openings.

6. A washer handling machine, having in combination, a rotary hopper having a series of openings formed in the periphery, a series of collecting fingers positioned opposite the openings, means for supporting the fingers to cause the latter to revolve about the axis of the hopper, means for successively actuating the fingers in a lengthwise direction to cause each finger to engage with a washer which has dropped through the adjacent opening, and mechanism for actuating the finger to completely remove the washer from the opening after the washer has been engaged by the finger.

7. A washer handling machine, having in combination, a rotary hopper having an opening formed in the periphery for the passage of a washer therethrough, a collecting finger positioned adjacent the opening, means for supporting the finger to cause the latter to revolve about the axis of the hopper, means for moving the finger in a lengthwise direction to engage with a washer after the latter has passed through the opening, and means for rocking the finger to remove the washer thus engaged from the opening.

8. A washer handling machine, having in combination, a rotary hopper having an opening formed in the periphery for the passage of a washer therethrough, a collecting finger positioned adjacent the opening, means for supporting the finger to cause the latter to revolve about the axis of the hopper, means for moving the finger in a lengthwise direction to engage with a washer after the latter has passed through the opening, means for rocking the finger to remove the washer thus engaged from the opening, and means for engaging with the washer after the finger has been rocked for forcing the washer along the finger.

9. A washer handling machine, having in combination, a rotary hopper having an opening formed therein for the passage of a washer therethrough, a collecting finger positioned in operative relation to the hopper, mechanism for actuating the finger relatively to the hopper to cause the finger to engage and remove a washer from the opening in the hopper, and means for preventing the removal of the washer from the finger after the washer has been removed from the hopper.

10. A washer handling machine, having in combination, a rotary hopper, having a series of openings formed in the periphery, a feed tube leading into the center of the hopper, a series of collecting fingers supported about the periphery of the hopper, means for causing the fingers to revolve about the axis of the hopper, and mechanism for automatically actuating the fingers to first engage with the washers which pass through the openings and to next remove the washers from the openings.

11. A washer handling machine, having in combination, a vertical hopper having a series of openings formed in the periphery, means for rotating the hopper, means for supporting the washers which drop through the openings in the hopper, a series of collecting fingers revolving about the axis of the hopper, and means for successively actuating the fingers to engage with the washers thus dropped through the openings.

12. A washer handling machine, having in combination, a hopper having an opening formed therein, a collecting finger supported in operative relation to the hopper, mechanism for moving the finger in a lengthwise direction to cause the finger to pass through the central opening in a washer, and mechanism for withdrawing the finger from engagement with the washer if the initial lengthwise movement of the finger is not sufficient to move the end of the latter through the opening in the washer.

13. A washer handling machine, having in combination, a hopper having an opening formed therein, a collecting finger positioned in operative relation to the hopper, mechanism for actuating the finger to cause the latter to first pass through the central opening in the washer and to next completely remove the washer from the opening in the hopper, and normally inoperative mechanism for withdrawing the finger from engagement with the washer if the end of the finger is not permitted to pass through the opening in the washer.

14. A washer handling machine, having in combination, a hopper having an opening formed therein, a collecting finger positioned in operative relation to the hopper, mechanism for imparting a predetermined lengthwise movement to the finger to cause the end of the latter to pass through the opening in a washer, and normally inoperative means for withdrawing the finger from engagement with the washer if less than the predetermined lengthwise movement is imparted to the finger.

15. A washer handling machine, having in combination, a rotary hopper having an opening formed therein, a collecting finger positioned adjacent the opening, means for causing the finger to revolve about the axis of the hopper, a stationary cam, connections between the cam and finger for moving the finger in a lengthwise direction to engage with the washer which has passed through the opening, a second stationary cam, and connections between the second cam and finger for rocking the finger to remove a washer from the opening after the washer has been engaged by the finger.

16. A washer handling machine having, in combination, a rotary hopper provided with a series of openings in the periphery into which the washers are adapted to drop by gravity, a spider journaled in axial alinement with the hopper, a series of fingers carried by the spider, and means for actuating the fingers to collect the washers from the openings in the periphery of the hopper.

17. A washer handling machine comprising a rotary hopper having an opening in the periphery into which a washer is adapted to drop by gravity, a collecting finger associated with the opening, means for actuating the finger to remove a washer from the opening, and a stationary inclined plate arranged to engage the washer and force the washer along the finger when the latter is actuated to remove the washer from the opening.

18. A washer handling machine having, in combination, a rotary hopper provided with an opening in the periphery into which a washer is adapted to drop by gravity, a collecting finger associated with the opening in the hopper and revolving about the axis of the hopper, and mechanism for actuating the finger to engage and lift the washer from the opening when the opening is at the top of the hopper.

ERASTUS E. WINKLEY.